United States Patent [19]
Katayama et al.

[11] 4,322,153
[45] Mar. 30, 1982

[54] DISPLAY DEVICE WITHIN THE VIEWFINDER OF A CAMERA

[75] Inventors: Akira Katayama, Tokyo; Koichi Higashi, Kawasaki, both of Japan

[73] Assignee: Nippon Kogaku K.K., Tokyo, Japan

[21] Appl. No.: 231,146

[22] Filed: Feb. 3, 1981

[30] Foreign Application Priority Data

Feb. 14, 1980 [JP] Japan ............................ 55/16416[U]

[51] Int. Cl.³ ........................ G03B 13/02; G03B 17/20
[52] U.S. Cl. ....................................... 354/225; 354/53; 354/289
[58] Field of Search ..................... 354/53, 60 E, 60 L, 354/155, 219, 224, 225, 289, 36, 38, 39

[56] References Cited

U.S. PATENT DOCUMENTS 4,118,723 10/1978 Yamazaki et al. .................. 354/155

*Primary Examiner*—L. T. Hix
*Assistant Examiner*—William B. Perkey
*Attorney, Agent, or Firm*—Shapiro and Shapiro

[57] ABSTRACT

A display device within the viewfinder of a camera capable of selectively setting an aperture priority automatic shutter speed control mode, a shutter speed priority automatic aperture control mode or a program exposure control mode includes a first display portion capable of displaying a preset aperture value, a second display portion capable of displaying a preset shutter speed, and a third display portion capable of displaying at least one of an automatically controlled aperture value and an automatically controlled shutter speed. The display device further includes display clearing means for clearing the display by the second display portion in response to the selection of the aperture priority automatic shutter speed control mode, clearing the display by the first display portion in response to the selection of the shutter speed priority automatic aperture control mode, and clearing the displays by the first and second display portions in response to the selection of the program exposure control mode.

5 Claims, 10 Drawing Figures

DISPLAY DEVICE WITHIN THE VIEWFINDER OF A CAMERA

BACKGROUND OF THE INVENTION

1. Field of the Invention

This invention relates to a device for displaying exposure information within the viewfinder of an automatic exposure control camera, and more particularly to an exposure information display device within the viewfinder of a camera capable of changing over the exposure controls by a shutter speed priority automatic exposure control mode, an aperture priority automatic exposure control mode and a program automatic exposure control mode.

2. Description of the Prior Art

In the prior art, the automatic exposure control modes of a camera includes a shutter speed priority automatic exposure control mode in which aperture value is automatically controlled so that a proper exposure may be provided in accordance with a preset shutter speed and the brightness of an object, an aperture priority automatic exposure control mode in which shutter speed is automatically controlled so that a proper exposure may be provided in accordance with a preset aperture value and the brightness of an object, and a program exposure control mode in which aperture value and shutter speed are automatically controlled by a combination of an aperture value and a shutter speed predetermined with respect to a metered exposure value (EV). Cameras are known which are capable of selectively accomplishing photography by more than two of these modes and in such cameras, it is desired that exposure information in conformity to the mode used during photography be displayed within the viewfinder.

U.S. Pat. No. 4,118,723 discloses an exposure data display device within the viewfinder of a camera in which the photography by a shutter speed priority automatic exposure control mode and the photography by an aperture priority automatic exposure control mode can be selectively changed over. In this device, two display portions for displaying a preset aperture value and a preset shutter speed, respectively, and a third display portion for displaying a controlled aperture value or shutter speed are provided within the viewfinder and a shutter element is shown for shielding the display portion for displaying the preset shutter speed when a mode selector selects the aperture priority automatic exposure control mode. This technique is applicable to the display in a camera having the photographing functions by two types of modes, but with respect to a camera having the photographing functions by three types of modes, i.e. the aperture priority, the shutter speed priority and the program automatic exposure control mode or a camera having the photographing functions by four types of modes, i.e. said three modes and a manual mode in which aperture value and shutter speed are manually set, this technique would bring confusions to the photographer due to inundation of information unless it is further improved.

SUMMARY OF THE INVENTION

It is an object of the present invention to provide, in a camera which is capable of effecting the photography by the aperture priority automatic exposure control mode, the shutter speed priority automatic exposure control mode and the program autoamtic exposure control mode, a display device for displaying better arranged exposure information within the viewfinder.

It is a further object of the present invention to provide a display device in which each mode selected by the photographer has a display form identifiable during the observation of the viewfinder.

The invention will become fully apparent from the following detailed description thereof taken in conjunction with the accompanying drawings.

DESCRIPTION OF THE PREFERRED EMBODIMENTS

Embodiments of the present invention will hereinafter be described with reference to the drawings.

Figure 1:
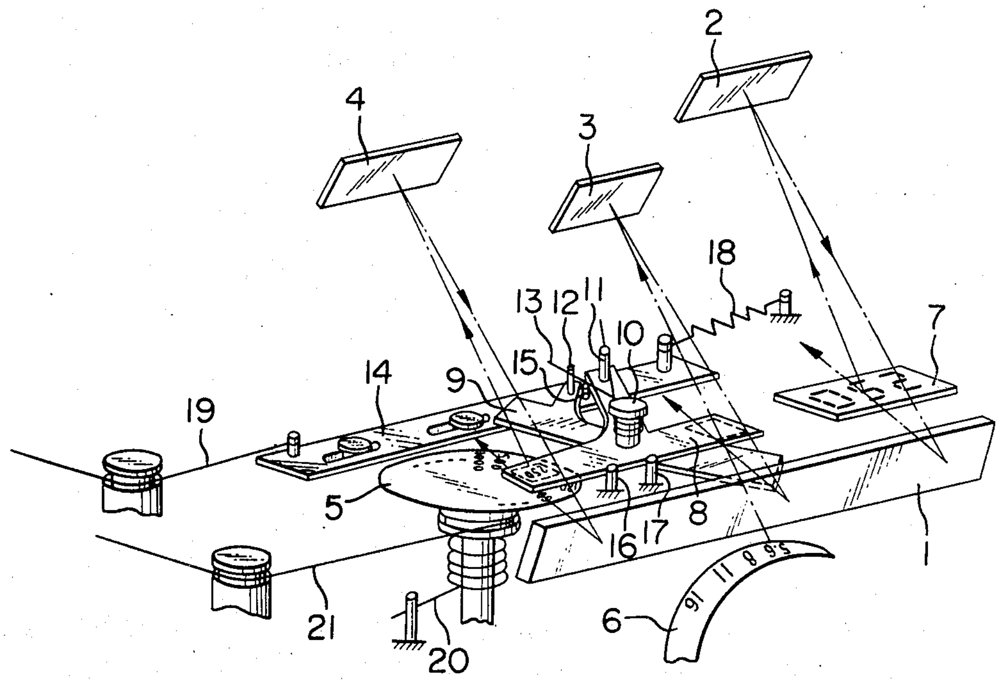
FIG. 1 is a perspective view showing essential portions of an embodiment of the present invention.
Figure 2:
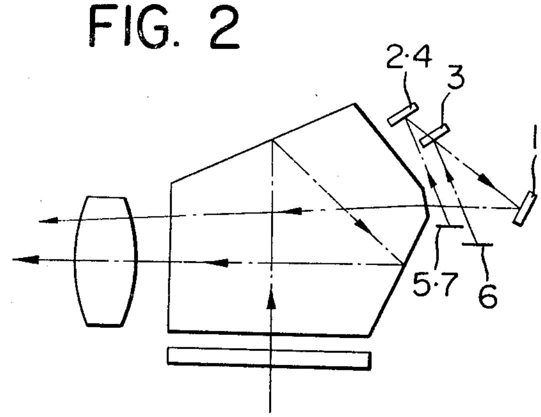
FIG. 2 shows the relation between a pentaprism and the reflection mirrors in the embodiment of FIG. 1.

As shown in FIGS. 1 and 2, reflection mirrors 1, 2, 3, 4 and display members 5, 6, 7 are disposed forwardly of a pentaprism. The set shutter speed display film 5 is transmission-illuminated by an extraneous light from therebelow and the light transmitted through this film is directed into the pentaprism via the reflection mirrors 4 and 1 in the named order. The lens aperture ring 6 calibrated with aperture values is reflection-illuminated by the extraneous light and the light reflected by this ring is directed into the pentaprism via the reflection mirrors 3 and 1 in the named order. The light emitted from a 7-segment LED 7 is directed into the pentaprism via the reflection mirrors 2 and 1 in the named order.

On the other hand, light-intercepting levers 8 and 9 for intercepting the lights from the film 5 and the aperture ring 6 respectively are mounted for rotation aout a common shaft 10 secured to a camera body. Each of the light-intercepting levers 8 and 9 has two light-intercepting arms and a projected portion, and is biased, by a torsion spring 13 engaged with pins 11 and 12 studded in these projected portions, in a direction in which the projected portions hold therebetween a pin 15 studded in a display change-over plate 14. Pins 16 and 17 studded in the camera body are for limiting the rotation of the light-intercepting levers 8 and 9.

The interception of the lights displaying shutter speed and aperture value may be accomplished by moving the display change-over plate 14, which is biased rightwardly as viewed in FIG. 1 by a spring 18, in response to a mode selector through the agency of a thread 19.

The set shutter speed display is changed over in response to a shutter dial, and this may be accomplished by rotating the set shutter speed display film 5, which is biased counterclockwise as viewed in FIG. 1 by a spring 20, in response to the shutter dial through the agency of a thread 21. In accordance with each exposure mode, proper or automatically controlled aperture value and shutter speed value are displayed on the 7-segment LED 7, and the change-over thereof may be accomplished by changing over a related switch in response to the mode selector.

Figure 3:
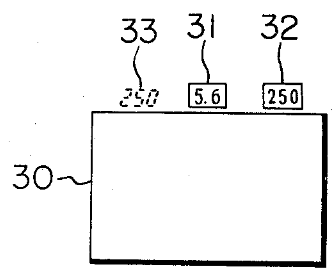
FIGS. 3 to 6 illustrate the display forms of various exposure modes in the embodiment of FIG. 1.

The display form of each exposure mode will now be described with reference to FIGS. 3 to 6. FIG. 3 shows the display form in manual mode. In this mode, the set aperture value is displayed on a first display portion 31 lying at the upper central part of a viewfinder picture plane 30 by the display member 6, the set shutter speed value is displayed on a second display portion 32 lying at the upper right part of the picture plane 30 by the display member 5, and a proper shutter speed value (or a proper aperture value) is displayed on a third display portion 33 lying at the upper left part of the picture plane 30 by the display member 7. Consequently, if the shutter dial (or the aperture ring) is operated to make the set shutter speed value (or the set aperture value) coincident with the proper shutter speed value (or the proper aperture value) displayed on the third display portion 33, proper exposure photography may be accomplished.

Figure 4:
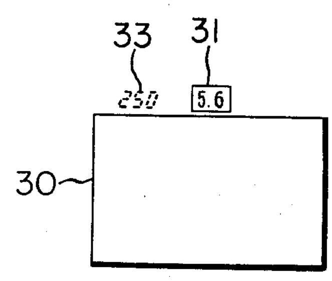
Figure 5:
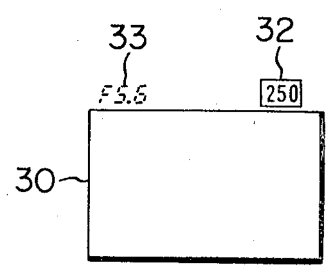

FIG. 4 shows the display form in aperture priority mode. In this mode, the set aperture value is displayed on the first display portion 31, an automatically controlled shutter speed value based on this set aperture value is displayed on the third display portion 33, and the shutter speed value cannot be set and therefore is not displayed on the second display portion 32 which is then shielded from light. FIG. 5 shows the display form in shutter speed priority mode. In this mode, the set shutter speed value is displayed on the second display portion 32, and a controlled aperture value based on this set shutter speed value is displayed on the third display portion 33, but the aperture value cannot be set and therefore the first display portion 31 is shielded from light.

Figure 6:
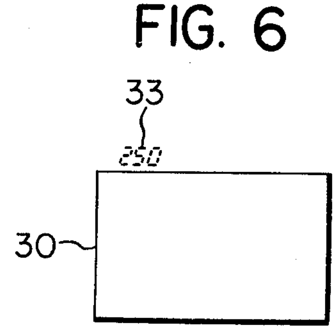

FIG. 6 shows the display form in program mode in a case where such mode is selectible. In this mode, an automatically controlled shutter speed value (or aperture value or the aperture value and the shutter value may be alternately turned on) is displayed on the third display portion 33, and the shutter speed value and the aperture value cannot be set and therefore the first and second display portions are shielded from light. By doing so, which mode is being selected can be readily known from the difference between the used display portions even in a case where program mode is selectible.

It is preferable that the display on the third display portion be made to visually differ from the displays on the first and second display portions. In the present embodiment, the above-described LED or the like is used to effect the display on the third display portion 33, and the numerical values provided on the aperture ring of the phototaking lens and the film are directed to the first and second display portions 31 and 32 to effect the displays thereon. By so constructing, proper values or controlled values and set values can be readily identified from each other. Further, if the three displays are carried out in the form of numerals as shown in FIGS. 3 to 6, the display within the viewfinder will become easier to see than in a case where dot display is adopted.

Figure 7:
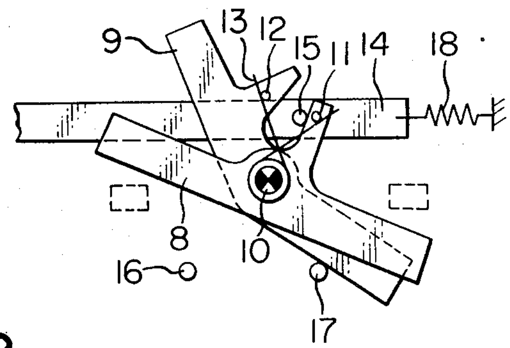
FIGS. 7 to 10 illustrate the operating conditions, in the respective modes, of the display change-over mechanism in the embodiment of FIG. 1.
Figure 8:
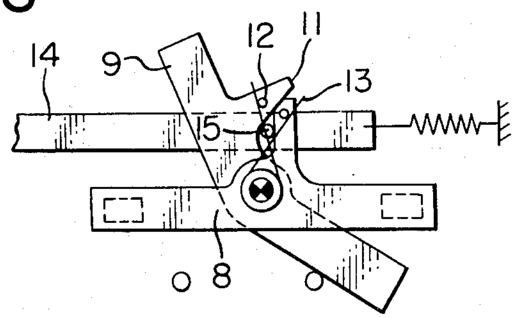
Figure 9:
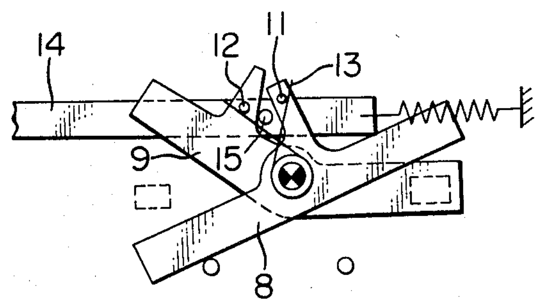
Figure 10:
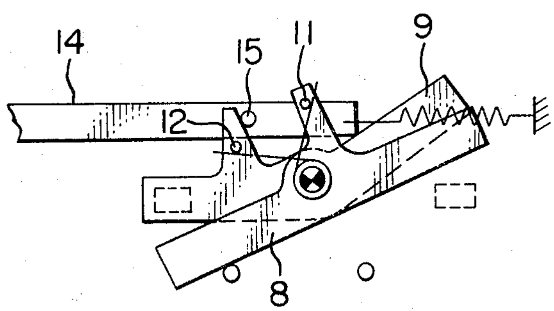

Reference is now had to FIGS. 7 to 10 to describe the operative condition, in each mode, of a display change-over mechanism operatively associated with the mode selector. FIG. 7 shows a manual mode which is a condition in which the display change-over plate 14 has been moved most rightwardly in response to the mode selector. In the condition of FIG. 7, both of the light-intercepting levers 8 and 9 are in a position in which they have been most rotated clockwisely about the shaft 10, and these levers have not yet come to two rectangular areas indicated by broken lines through which the display lights pass and therefore, any of the display lights is not intercepted. Consequently, the display within the viewfinder becomes such as shown in FIG. 3. FIG. 8 shows a program mode which is a condition in which the change-over plate 14 has been moved a little leftwardly from the position of FIG. 7 by operation of the mode selector (this corresponds to FIG. 1). In this condition, both of the lights travelling to the first and second display portions 31 and 32 are intercepted by the light-intercepting lever 8. Consequently, the display within the viewfinder becomes such as shown in FIG. 6. FIG. 9 shows a shutter speed priority mode which is a condition in which the change-over plate 14 has been moved further leftwardly by operation of the mode selector. In this condition, only the light travelling to the first display portion 31 is intercepted by the light-intercepting lever 9. Consequently, the display within the viewfinder becomes such as shown in FIG. 5. Lastly, FIG. 10 shows an aperture priority mode which is a condition in which the change-over plate 14 has been moved most leftwardly by the mode selector. In this condition, only the light travelling to the second display portion 32 is intercepted by the light-intercepting lever 9. Consequently, the display within the viewfinder becomes such as shown in FIG. 4.

In the embodiment, the set aperture value, the set shutter speed value and a proper value or a controlled value are displayed at the positions 31, 32 and 33, respectively, whereas the display position of each value in the present invention is not restricted to that shown in the embodiment.

We claim:

1. A display device within a viewfinder of a camera capable of selectively setting, by operation of a mode selector, any of an aperture priority automatic shutter speed control mode, a shutter speed priority automatic aperture control mode or a program exposure control mode in which aperture and shutter speed are automatically controlled in accordance with a predetermined program, said display device including a first display portion capable of displaying a preset aperture value, a second display portion capable of displaying a preset shutter speed, and a third display portion capable of displaying at least one of an automatically controlled aperture value and an automatically controlled shutter speed, said display device further comprising:

display clearing means for clearing the display by said second display portion in response to the selection of the aperture priority automatic shutter speed control mode by said mode selector, clearing the display by said first display portion in response to the selection of the shutter speed priority automatic aperture control mode, and clearing the displays by said first and second display portions in response to the selection of the program exposure control mode.

2. A display device according to claim 1, further comprising first optical means for directing into said viewfinder the visual information regarding the preset aperture value, and second optical means for directing into said viewfinder the visual information regarding the preset shutter speed, and wherein said display clearing means includes a light-intercepting means movable between a first position in which it is in a blocking relationship with respect to the light of said first optical means to prevent the information regarding said preset aperture value from reaching the view field of the viewfinder, a second position in which it is in a blocking relationship with respect to the light of said second optical means to prevent the information regarding said preset shutter speed from reaching the view field of the viewfinder, and a third position in which it is in a blocking relationship with respect to the lights of said first and second optical means to prevent the information regarding said preset aperture value and said preset shutter speed from reaching the view field of the viewfinder.

3. A display device according to claim 1, wherein said camera is further capable of setting, by selecting operation of said mode selector, a manual mode in which aperture and shutter speed are manually preset, and when the manual mode is selected by said mode selector, said display clearing means operates so as not to clear any of the displays by said first and second display portions.

4. A display device according to claim 1, wherein the third display portion of said display device displays an automatically controlled shutter speed to obtain a proper exposure when the aperture priority automatic shutter speed control mode is selected by said mode selector, said third display portion displays an automatically controlled aperture value to obtain a proper exposure when the shutter speed priority automatic aperture control mode is selected, and said third display portion displays at least one of the automatically controlled aperture value and shutter speed when the program exposure control mode is selected.

5. A display device according to claim 1, further comprising a display element for effecting on said third display portion a display visually different from the displays by said first and second display portions.

* * * * *